(12) United States Patent
Drader et al.

(10) Patent No.: US 8,378,527 B2
(45) Date of Patent: Feb. 19, 2013

(54) UNIVERSAL SERIAL BUS CURRENT LIMIT

(75) Inventors: Marc A Drader, Kitchener (CA); David James Mak-Fan, Waterloo (CA); Dusan Veselic, Oakville (CA)

(73) Assignee: Research In Motion Limited, Waterloo, Ontario (CA)

( * ) Notice: Subject to any disclaimer, the term of this patent is extended or adjusted under 35 U.S.C. 154(b) by 1623 days.

(21) Appl. No.: 10/857,966

(22) Filed: Jun. 2, 2004

(65) Prior Publication Data
US 2005/0269883 A1 Dec. 8, 2005

(51) Int. Cl.
H02G 9/02 (2006.01)
(52) U.S. Cl. .................................. 307/131; 307/112
(58) Field of Classification Search ............... 307/131, 307/112
See application file for complete search history.

(56) References Cited

U.S. PATENT DOCUMENTS

| | | | | |
|---|---|---|---|---|
| 5,572,395 | A * | 11/1996 | Rasums et al. ............... | 361/58 |
| 5,886,431 | A | 3/1999 | Rutigliano | |
| 6,104,584 | A * | 8/2000 | Liu .................................. | 361/18 |
| 6,163,142 | A * | 12/2000 | Tsujimoto ..................... | 323/283 |
| 6,178,514 | B1 | 1/2001 | Wood | |
| 6,335,654 | B1 * | 1/2002 | Cole ............................. | 327/546 |
| 6,456,050 | B1 * | 9/2002 | Agiman ........................ | 323/282 |
| 6,578,152 | B1 * | 6/2003 | Burnside ....................... | 713/300 |
| 6,665,801 | B1 * | 12/2003 | Weiss ............................ | 713/300 |
| 6,906,499 | B2 * | 6/2005 | Hussein et al. ............... | 323/222 |
| 6,934,788 | B2 * | 8/2005 | Laity et al. .................... | 710/303 |
| 7,132,818 | B2 * | 11/2006 | Matsuura ...................... | 323/222 |
| 2002/0015272 | A1 * | 2/2002 | Hattori ......................... | 361/93.1 |
| 2003/0075993 | A1 | 4/2003 | Fadell et al. | |
| 2003/0142519 | A1 * | 7/2003 | Walters et al. ................. | 363/89 |
| 2004/0164708 | A1 * | 8/2004 | Veselic et al. ................. | 320/132 |

FOREIGN PATENT DOCUMENTS

| | | |
|---|---|---|
| DE | 19821759 A1 | 12/1998 |
| JP | 09284998 | 10/1997 |
| JP | 2003167636 | 6/2003 |

OTHER PUBLICATIONS

Summons to Attend Oral Proceedings Pursuant to Rule 115(1) EPC; EP Patent Application No. 04253271.3; Apr. 19, 2010; 5 pgs.
European Examination Report; Application No. 10181220.4; Mar. 7, 2011; 3 pages.
Extended European Search Report; Application No. 10181220.4; Jun. 8, 2011; 9 pages.
European Examination Report; Application No. 10181220.4; Jan. 24, 2012; 6 pages.

* cited by examiner

*Primary Examiner* — Adi Amrany
(74) *Attorney, Agent, or Firm* — Conley Rose, P.C.; J. Robert Brown, Jr.

(57) ABSTRACT

A load device includes a power input having an interface to a power supply; a peripheral power bus including an internal capacitance, and an active switch coupled to the power input and the peripheral power bus for applying power from the power input to the peripheral power bus. The load device also includes a switch controller coupled to the active switch for regulating the in-rush current drawn by the internal capacitance through the active switch while the internal capacitance is being charged.

17 Claims, 3 Drawing Sheets

UNIVERSAL SERIAL BUS CURRENT LIMIT

FIELD OF THE INVENTION

The invention described herein relates to a mechanism for interfacing a load with a power supply. In particular, the invention described herein relates to a method and apparatus for powering a load from a current-limited power supply in circumstances where the interim load current demands of the load might exceed the current source capabilities of the power supply.

BACKGROUND OF THE INVENTION

The Universal Serial Bus (USB) standard was an improvement over the conventional serial bus standard, partly due to the fact that the USB cable could supply power to the peripheral device. As a result, peripheral manufacturers could supply new peripherals which did not need there own respective power supply adapter.

The USB standard imposes a limit on the maximum allowable current that a peripheral device can draw from the VBUS. According to the USB standard, a device attached to the VBUS must limit its current draw to 100 mA for low power bus-powered devices, and 500 mA for high power bus-powered devices. This limitation prevents peripheral devices which have excessive load current demands from damaging the USB connection.

A peripheral device might draw an excessive load current ("in-rush current") only for the interim period required to charge the internal capacitors of the peripheral device. Thereafter, the current drawn by the peripheral device might be within the maximum allowable limit. However, the interim period may be greater than that tolerated by the USB standard. As a result, the number of peripheral devices that can take advantage of the power supply capabilities of the USB standard is limited.

Therefore, there is a need for a mechanism for powering a load from a current-limited power supply where the interim load current demands of the load might exceed the current source capabilities of the power supply. Moreover, there is a need for an improved mechanism for powering a peripheral device having a large in-rush current draw from a USB connection.

SUMMARY OF THE INVENTION

According to one aspect of the invention described herein, there is provided a load device that includes a power input to a power supply; a peripheral power bus having an internal capacitance, and an active switch coupled to the power input and the peripheral power bus for applying power from the power input to the peripheral power bus. The load device also includes a switch controller coupled to the active switch for regulating the in-rush current drawn by the internal capacitance through the active switch.

According to another aspect of the invention described herein, in a load comprising a power input to a power supply, a peripheral power bus including an internal capacitance, and an active switch for applying power from the power input to the peripheral power bus, a method for powering the load from the power supply involves regulating an in-rush current drawn by the internal capacitance through the active switch.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
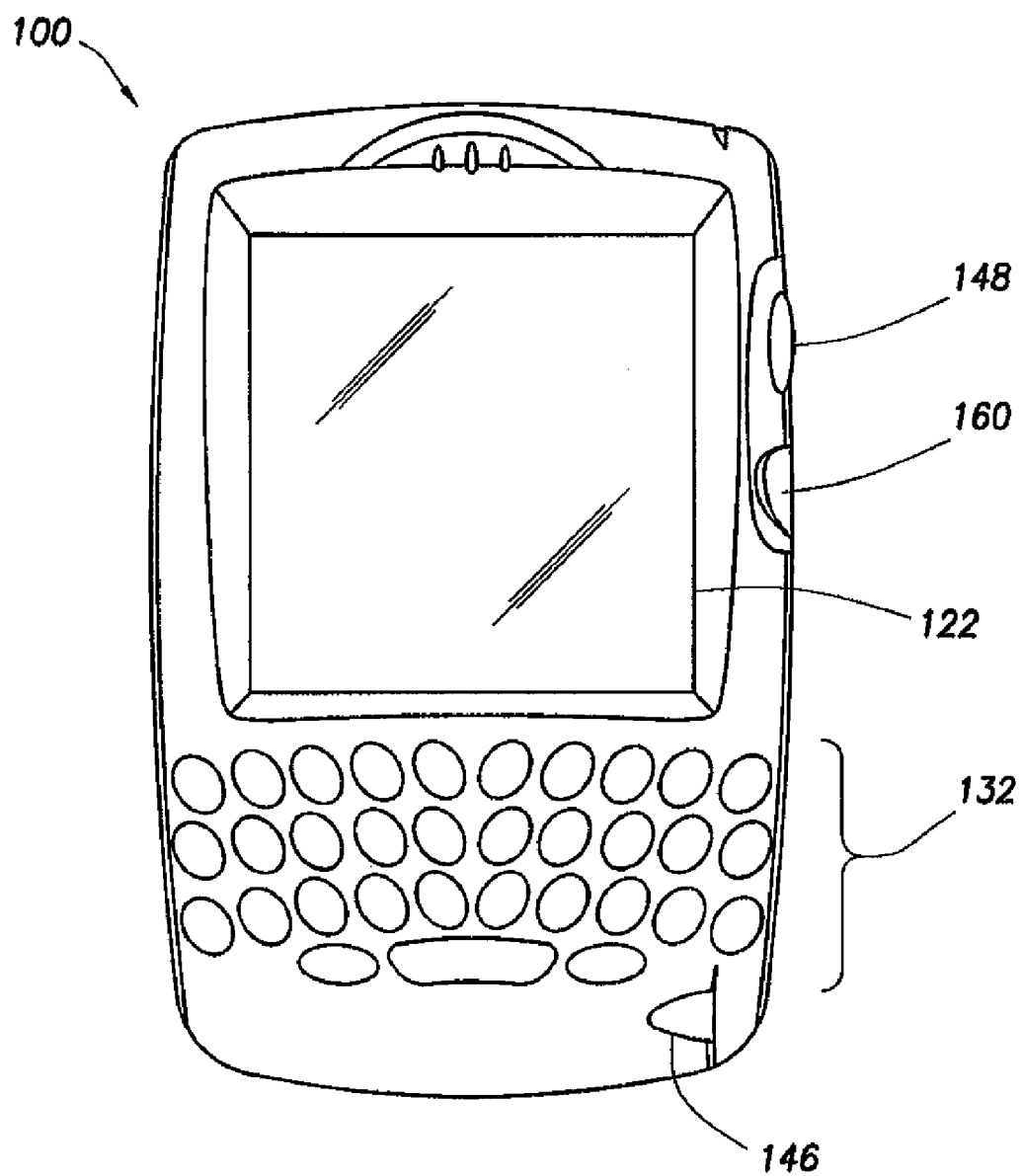
FIG. 1 is a front plan view of a handheld computing device, according the invention described herein.

Referring now to FIG. 1, there is shown a handheld computing device, denoted generally as 100, provided according to one aspect of the invention. The handheld computing device 100 includes a display 122, a function key 146 and a system motherboard (not shown) disposed within a common housing. The display 122 is a self-contained peripheral device that is connected to and receives power from the system motherboard. In one the embodiment, the display 122 comprises a reflective or trans-reflective LCD display. Alternately, in another embodiment, the display 122 comprises a transmissive LCD display. Although these types of displays 122 do not draw significant power during normal operation, the in-rush current drawn by these types of displays 122 when they are powered up can be significant.

The function key 146 functions as a power on/off switch for the handheld computing device 100, and may also function as a backlight key for the display 122.

In addition to the display 122 and the function key 146, the handheld computing device 100 includes user data input means for inputting data to the data processing means. As shown, preferably the user data input means includes a keyboard 132, a thumbwheel 148 and an escape key 160.

Typically, the handheld computing device 100 is a two-way wireless communication device having at least voice and data communication capabilities. Further, preferably the handheld computing device 100 has the capability to communicate with other computer systems on the Internet. Depending on the exact functionality provided, the wireless handheld computing device 100 may be referred to as a data messaging device, a two-way pager, a wireless e-mail device, a cellular telephone with data messaging capabilities, a wireless Internet appliance, or a data communication device, as examples.

Figure 2:
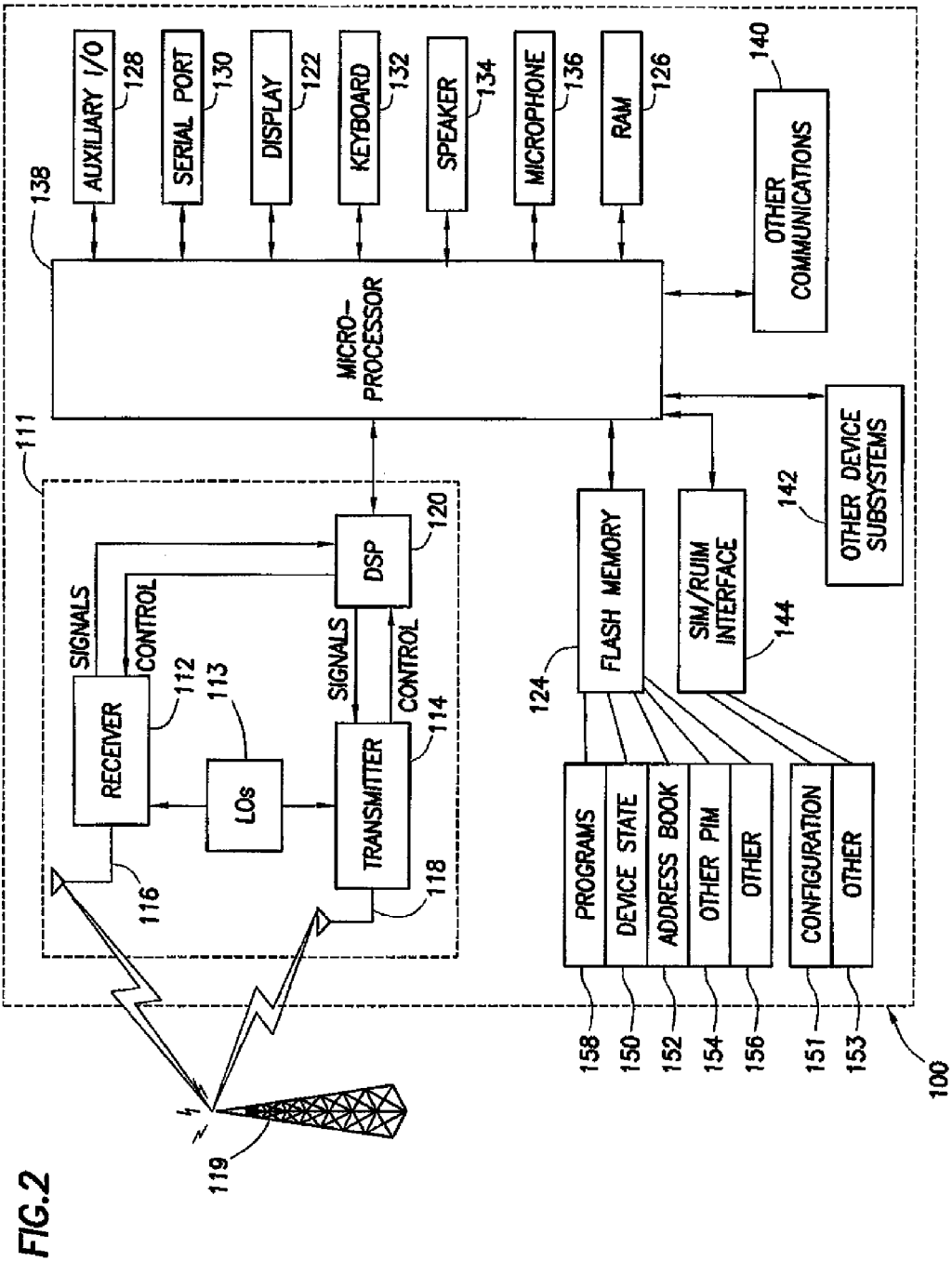
FIG. 2 is a schematic view depicting functional details of the handheld computing device

FIG. 2 depicts functional details of the handheld computing device 100. Where the handheld computing device 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the-type of network 119. For example, in the Mobitex and DataTAC networks, the handheld computing device 100 is registered on the network using a Unique identification number associated with each handheld computing device. In UMTS and GPRS networks, and in some CDMA networks, however, network access is associated with a subscriber or user of the handheld computing device 100. A GPRS Held computing device therefore requires a subscriber identity module (SIM) card in order to operate on a GPRS network, and a RUIM in order to operate on some CDMA networks. Without a valid SIM/RUIM card, a GPRS/UMTS/CDMA held computing device may not be fully functional. Local or non-network communication functions, as well as legally required functions (if any) such as "911" emergency calling, may be available, but the handheld computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64 K of memory and hold many key configuration 151, and other information 153 such as identification, and subscriber related information.

When required network registration or activation methods have been completed, the handheld computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 2 perform communication-related functions, whereas other subsystems may provide "resident" or on-device functions. Some subsystems, such as keyboard 132 and display 122, for example, may be used for both communication-related functions, such as entering a text message for transmission over a communication network, and device-resident functions such as a calculator or task list.

Another such subsystem comprises a power management subsystem 142 that performs power management functions for the handheld computing device 100. The power management subsystem 142 will be described in detail below.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or pans thereof, may be temporarily loaded into a volatile memory such as RAM 126. Received communication signals may also be stored in RAM 126.

As shown, the flash memory 124 can be segregated into different areas for both computer programs 158 and program data storage 150. 152, 154 and 156. These different storage areas indicate that each program can allocate a portion of flash memory 124 for their own data storage requirements. In addition to its operating system functions, preferably the microprocessor 138 enables execution of software applications on the handheld computing device. A predetermined set of applications that control basic operations, will normally be installed on the handheld computing device 100 during manufacturing.

One set of basic software applications might perform data and/or voice communication functions, for example. Another set of basic software applications comprises computer processing instructions which, when accessed from the flash memory 124 and/or the RAM 126 and executed by the microprocessor 138, define a switch controller 102. The switch controller 102 interacts with the aforementioned power management subsystem 142 and performs power management functions. The switch controller 102 will be described in detail below.

A preferred software application may be a personal information manager (PIM) application having the ability to organize and manage data items relating to the user of the handheld computing device such as, but not limited to, e-mail, calendar events, voice mails, appointments, and task items. Naturally, one or more memory stores would be available on the handheld computing device to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the user's corresponding data items stored or associated with a host computer system. Further applications may also be loaded onto the handheld computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the handheld computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the handheld computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136. Alternative voice or audio I/O subsystems, such as a voice message recording subsystem, may also be implemented on the handheld computing device 100. Although voice or audio signal output is preferably accomplished primarily through the speaker 134, display 122 may also be used to provide an indication of the identity of a calling party, the duration of a voice call, or other voice call related information for example.

Serial port 130 in FIG. 2, would normally be implemented in a personal digital assistant (PDA)-type handheld computing device for which synchronization with a user's desktop computer (not shown) may be desirable. The serial port 130 enables a user to set preferences through an external device or software application and would extend the capabilities of the handheld computing device 100 by providing for information or software downloads to he handheld computing device 100 other than through a wireless communication network.

Preferably, the serial port 130 comprises a Universal Serial Bus (USB) port that interfaces with the desktop computer over a USB cable. The configuration of the serial port 130 as a USB interface is advantageous since it allows the desktop computer to supply power to the handheld computing device 100 through the power management subsystem 142, without requiring a separate power supply.

Other communications subsystems 140, such as a short-range communications subsystem, is a further optional component which may provide for communication between the handheld computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 3:
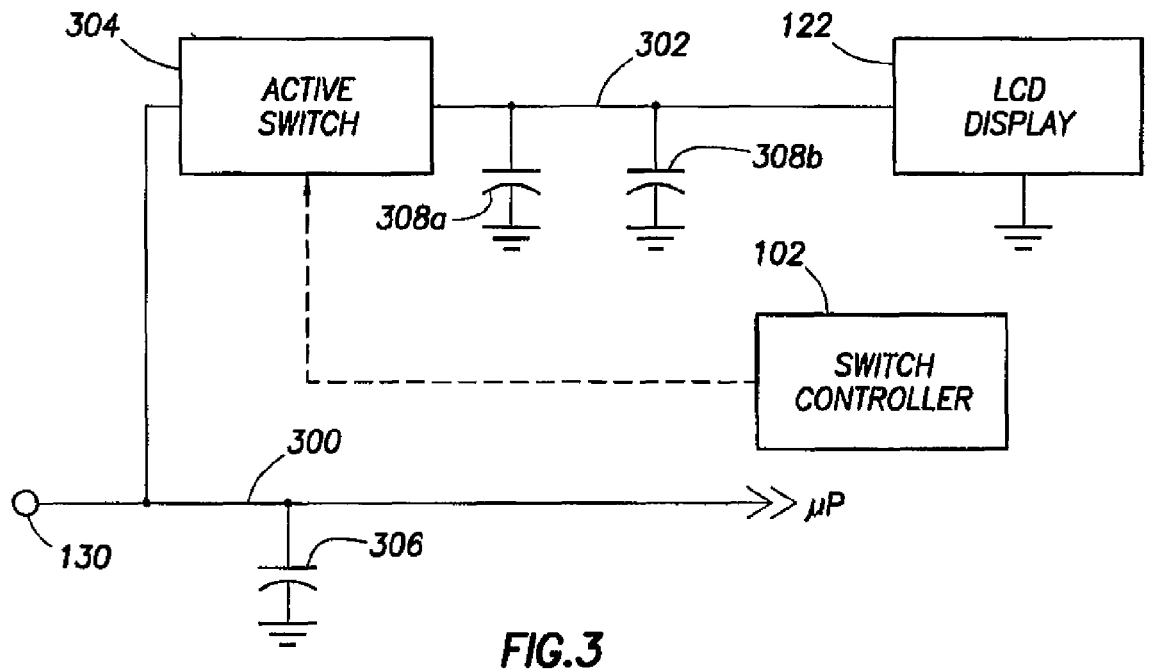
FIG. 3 is a schematic view of the circuitry comprising the power management subsystem.

FIG. 3 depicts the aforementioned power management subsystem 142. As shown, the power management subsystem 142 comprises a system power bus 300, a peripheral power bus 302, and an active switch 304 coupled to the system power bus 300 and the peripheral power bus 302. The system power bus 300 provides power to the microprocessor 138, the flash memory 124, the RAM 126, the auxiliary input/output (I/O) subsystems 128, the communications subsystem 140 and the device subsystems 142 (including the power management subsystem 142). The system power bus 300 interfaces with the power supply channel of the USB port 130, and receives its power from the desktop computer through a USB cable connected between the desktop computer and the USB port 130. The system power bus 300 includes a large system power bus capacitor 306 that reduces harmonics in the voltage supplied to the system power bus 300 from the USB port 130.

As shown, the peripheral power bus 302 provides power to the LCD display 122. The LCD display 122 includes large peripheral power bus capacitors 308a, 308b that reduce harmonics in the voltage supplied to the LCD display 122 by the peripheral power bus 302. Alternately, the peripheral power bus capacitors 308 may be provided directly on the peripheral power bus 302. In either case, the peripheral power bus capacitors 308 introduce a large capacitive load on the peripheral power bus 302 that will attempt to draw a large in-rush current when the LCD display 122 is powered-up.

The active switch 304 is disposed electrically in series between the system power bus 300 and the peripheral power bus 302, and supplies power to the peripheral power bus 302 from the system power bus 300. Typically, the voltage required by the LCD display 122 is greater than the system bus voltage. Accordingly, preferably the active switch 304 acts as a voltage amplifier that provides the correct operating voltage for the LCD display 122. Preferably, the active switch 304 comprises a LT 3200-5 charge pump, however other types of active switches may also be used.

The switch controller 102 is coupled to a gate input of the active switch 304, and controls the operation of the active switch 304. The switch controller 102 is configured to regulate the in-rush current drawn by the peripheral power bus capacitors 308 Through the active switch 304.

The method of operation of the switch controller 102 will now be described. Initially, a user of the handheld computing device 100 connects a USB cable between a desktop computer and the USB port 130 on the handheld computing device 100. Then, the user depresses the power on/off key 146 on the handheld computing device 100, thereby signalling the switch controller 102 to begin powering up the display 122.

As discussed above, the USB standard limits the maximum current that can be drawn from the USB cable by a low power bus-powered device to 100 mA (although the source end of the USB cable may be capable of sourcing a much larger current). However, ordinarily, the current that is initially drawn by the peripheral power bus capacitors 308 will greatly exceed that limit, at least until the peripheral power bus capacitors 308 become charged. Since the USB standard may require the handheld computing device 100 to limit its current draw to 100 mA, ordinarily it would not be possible to power up the handheld computing device 100 from the USB cable.

To overcome this problem, the switch controller 102 pulse width modulates the active switch 304 by applying a periodic gate signal to the gate input of the active switch 304, which causes the active switch 304 to periodically open and close. As a result, the active switch 304 only draws short bursts of current from the system power bus 300. At the same time, the active switch 304 slowly charges the peripheral power bus capacitors 308 by applying a corresponding series of short current pulses to the peripheral power bus 302.

The pulse width of the periodic gate signal is selected so that the average current drawn by the handheld computing device 100 is substantially less than that which the handheld computing device 100 would otherwise draw if the active switch 304 was maintained on continuously. Conversely, the pulse width of the periodic gate signal is also selected so that the instantaneous voltage at the system power bus 300 remains above the minimum voltage level necessary for proper operation of the hardware components powered by the system power bus 300.

The switch controller 102 continues to apply the periodic gate signal to the active switch 304 until the peripheral power bus capacitors 308 are substantially fully charged Thereafter, the switch controller 102 maintains the active switch 304 fully on.

Since the load characteristics of the LCD display 122 are known, the maximum time required for the peripheral power bus capacitors 308 to reach fall charge can be determined beforehand. Accordingly, the switch controller 102 continues to apply the periodic gate signal to the active switch 304 for the predetermined maximum time period that would be required for the peripheral power bus capacitors 308 to become substantially fully charged.

Figure 4:
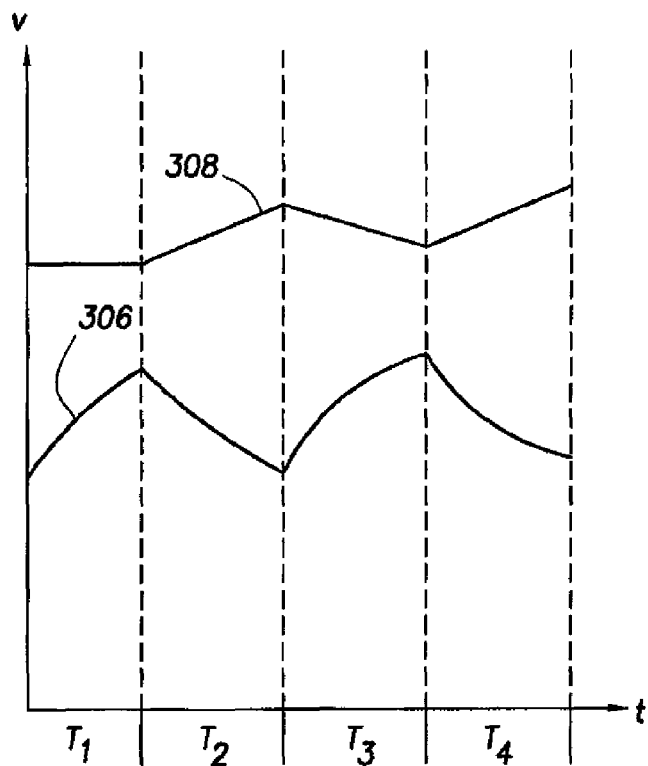
FIG. 4 is a diagram of the charging waveform for the system power bus and the peripheral power bus capacitors of the power management subsystem.

FIG. 4 depicts the charging waveform for the system power bus capacitor 306, and the peripheral power bus capacitors 308. As shown, during the time interval T1, the active switch 304 is off, which causes system power bus capacitor 306 to charge. The switch controller 102 then turns the active switch 304 on for the time interval T2, which causes the peripheral power bus capacitors 308 to charge, and the system power bus capacitor 306 to discharge. The duration of the time interval T2 is such that the instantaneous voltage at the system power bus 300 does not fall below the minimum system voltage.

During the time interval T3, the switch controller 102 turns the active switch 304 off, which causes the system power bus capacitor 306 to charge and the peripheral power bus capacitors 308 to discharge. The duration of the time interval T3 is such that the instantaneous voltage of the peripheral bus 302 at the end of the interval T3 is greater than the instantaneous voltage of the peripheral bus 302 at the start of the interval T3. The switch controller 102 repeats the charging phases represented by the charging intervals T2, T3 until the peripheral power bus capacitors 308 become substantially fully charged.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A load device, comprising:
    a system power bus having a universal serial bus (USB) interface;
    a peripheral power bus including at least one capacitor in electrical communication with the peripheral power bus;
    an active switch coupled to the system power bus and the peripheral power bus for applying power from the system power bus to the peripheral power bus, the active switch including a switch input for controlling an operational interval of the active switch; and
    a switch controller coupled to the active switch, the switch controller that cyclically opens and closes the active switch by applying a periodic gate signal to the switch input for a predetermined time period, the periodic gate signal comprising a plurality of pulses, all of the pulses having substantially identical pulse-width, the applied periodic gate signal determined so as to limit the current drawn by the peripheral power bus to be within USB standard limits.

2. The load device according to claim 1, wherein the applied periodic gate signal is further determined to maintain an instantaneous voltage at the system bus above a predetermined lower limit.

3. The load device according to claim 1, wherein the applied periodic gate signal is further determined to bring the at least one capacitor up to a predetermined voltage level.

4. The load device according to claim 2, wherein the pulse-width is predetermined to maintain the instantaneous voltage at the system bus above the predetermined lower limit.

5. The load device according to claim 1, wherein the load comprises a portable computing device.

6. The load device according to claim 1, wherein the instantaneous voltage at the system power bus is maintained below an instantaneous voltage of the peripheral power bus.

7. In a load comprising a system power bus having a power input having a universal serial bus (USB) interface, a peripheral power bus including at least one capacitor in electrical communication with the peripheral power bus, and an active switch for applying power from the system power bus to the peripheral power bus, the active switch including a switch input for controlling an operational interval of the active switch, a method comprising:
    applying a periodic gate signal to the active switch input, the periodic gate signal determined to cyclically open and close the active switch for a predetermined time period, the periodic gate signal comprising a plurality of pulses, all of the pulses having substantially identical pulse-width, where the applied periodic gate signal is determined so as to limit the current drawn to be within USB standard limits.

8. The method according to claim 7, wherein the applied periodic gate signal is further determined to maintain an instantaneous voltage at the system bus above a predetermined lower limit.

9. The method according to claim 8, wherein the pulse-width is predetermined to maintain the instantaneous voltage at the system bus above the predetermined lower limit.

10. The method according to claim 7, further comprising determining the applied gate signal such that the one or more capacitors are charged up to a predetermined voltage level.

11. The method according to claim 7, wherein the load comprises a portable computing device.

12. The method according to claim 7, wherein the instantaneous voltage at the system power bus is maintained below an instantaneous voltage of the peripheral power bus.

13. A computer-readable medium including computer processing instructions for a processing unit of a portable computing device, the portable computing device comprising a system power bus having a universal serial bus (USB) interface, a peripheral power bus including at least one capacitor in electrical communication with the peripheral power bus, and an active switch coupled to the system power bus and the peripheral power bus for applying power from the system power bus to the peripheral power bus, the active switch including a switch input for controlling an operational interval of the active switch, the computer processing instructions when executed by the processing unit causing the portable computing device to cyclically open and close the active switch for a predetermined time period by applying a periodic gate signal to the switch input, the periodic gate signal comprising a plurality of pulses, all of the pulses having substantially identical pulse-width fixed to limit the current drawn by the peripheral power bus to be within USB standard limits.

14. The computer-readable medium according to claim 13, wherein the applied periodic gate signal is further determined to maintain an instantaneous voltage at the system bus above a predetermined lower limit.

15. The computer-readable medium according to claim 14, wherein the pulse-width is predetermined to maintain the instantaneous voltage at the system bus above the predetermined lower limit.

16. The computer-readable medium according to claim 13, wherein the computer processing instructions further cause the portable computing device to cyclically open and close the active switch with the periodic gate signal until the one or more capacitors have charged up to a predetermined voltage level.

17. The computer-readable medium according to claim 13, wherein the instantaneous voltage at the system power bus is maintained below an instantaneous voltage of the peripheral power bus.

* * * * *